Jan. 14, 1930.　　　A. E. BAILEY, JR　　　1,743,750
MOTION DAMPING MEANS
Filed Oct. 24, 1927

Inventor:
Allen E. Bailey, Jr.,
by
His Attorney.

Patented Jan. 14, 1930

1,743,750

UNITED STATES PATENT OFFICE

ALLEN E. BAILEY, JR., OF SCHENECTADY, NEW YORK, ASSIGNOR TO GENERAL ELECTRIC COMPANY, A CORPORATION OF NEW YORK

MOTION-DAMPING MEANS

Application filed October 24, 1927. Serial No. 228,244.

My invention relates to motion damping means for members having intermittent rotary motion, and has for its object the provision of simple and reliable means for damping oscillations and checking the acceleration of members rotating about a vertical axis.

My invention has particular application in the damping of members having intermittent rotary motion, such as electrical instruments for receiving angular motion, whereby the members are brought to rest in the shortest possible time. It will be understood that an electrical receiver of angular motion usually goes through a series of oscillations, due to its inertia, at the end of each movement before finally coming to rest, the amplitude of these oscillations varying with the speed of its rotor member. The utilization of the receiver in its new position for indicating or control purposes is thus appreciably delayed by the oscillation period.

In one of its aspects my invention relates to the provision of a simple and reliable motion damper for members rotating about a vertical axis. In carrying out my invention in one form I mount an inertia body on the end of the member to be damped so that the member is free to turn with the smallest possible bearing friction independently of the inertia body. I also provide an energy dissipating connection between the member and the inertia body comprising a lost-motion connection permitting limited freedom of movement of the member and a clutch which slips to dissipate energy.

Figure 1:
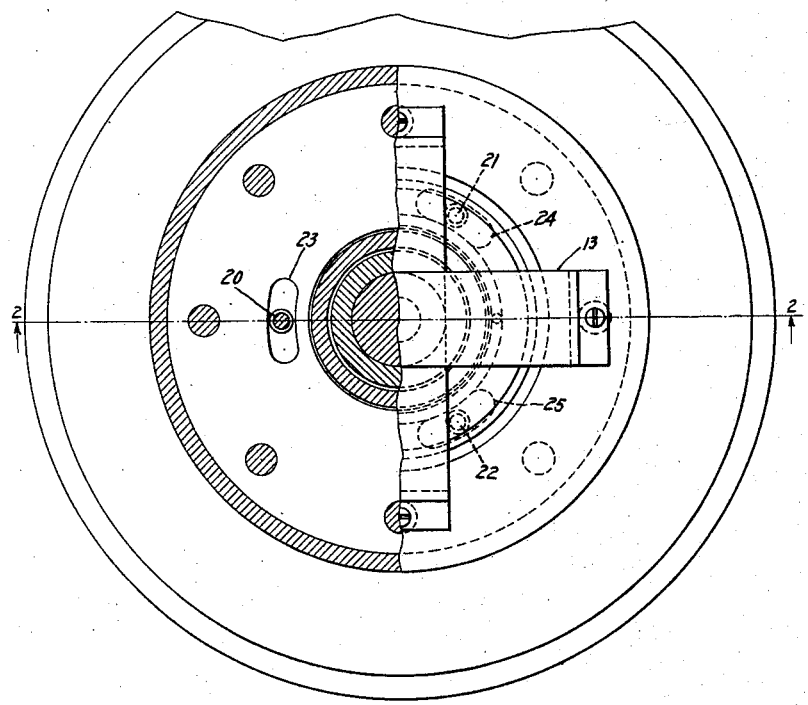
Figure 2:
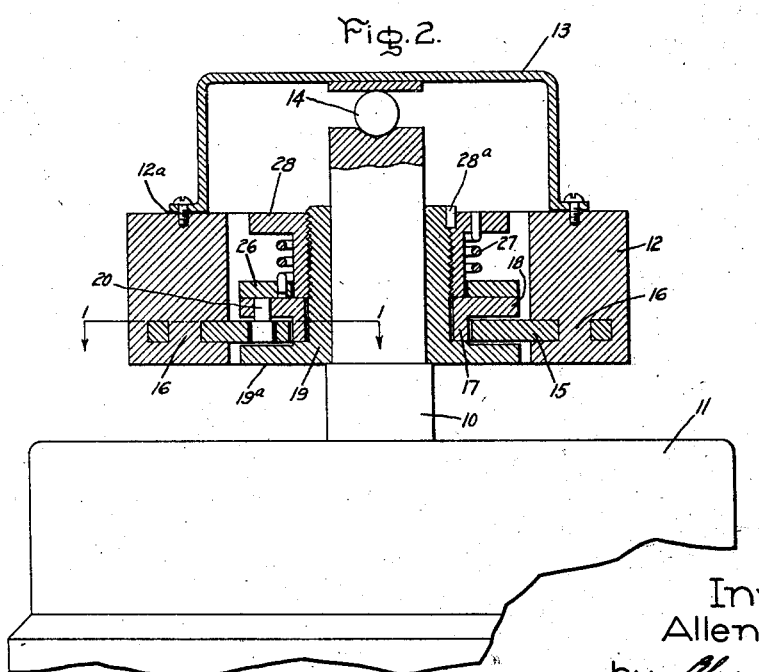

For a more complete understanding of my invention reference should be had to the accompanying drawing in which Fig. 1 is a plan view partly in section along the line 1—1 of Fig. 2 looking in the direction of the arrows of motion damping means embodying my invention as applied to an instrument for receiving angular motion; and Fig. 2 is an elevation view mainly in section along line 2—2 of Fig. 1 looking in the direction of the arrows of the device shown in Fig. 1.

Referring to Figs. 1 and 2 of the drawing, I have shown my invention in one form as applied to the rotor shaft 10 of an electrical instrument 11 for receiving angular motion. My invention obviously has application however to various other moving members. The receiver 11 may be of any suitable type, for example, it may be of an alternating current type and provided with a polycircuit armature winding and with a field winding supplied with alternating current rotatably associated therewith. In the present application of my invention the shaft 10 is designed to rotate about a vertical axis.

Surrounding the shaft 10 is an annular inertia body 12 in the form of a flywheel rim having its axis coincident with the axis of the shaft. This body is supported on the upper end of the shaft by means of a bracket 13 comprising four arms extending at right angles to each other, the outer ends of the arms being bent downward and secured to the body 12 by suitable screws. Shims 12$^a$ are provided between the arms and the body 12 so that the arms and the body 12 may be separated a predetermined distance. The center of the bracket 13 is mounted on the shaft 10, and as shown a ball bearing 14 is provided giving substantially point contact on the bracket 13 on the axis of rotation of the bracket, whereby the friction between the bracket 13 and the shaft 10 is reduced to the smallest possible value. A depression forming a seat for the ball is provided on the end of the shaft.

A lost motion driving connection arranged also for the dissipation of energy is provided between the shaft and the inertia body. As shown, a ring or washer-shaped member 15 is secured in concentric relation to the body. The body or rim 12 may conveniently be formed of lead or other suitable material which may be cast on the member 15, suitable apertures 16 being provided in the member 15 so as to securely anchor the body 12 thereto. This member 15 fits loosely over a ring 17 provided with a fairly wide flange 18. The ring 17 in turn fits loosely over a sleeve 19 which is rigidly secured to the shaft 10 by suitable means such as a key and slot, not shown. Secured to the flange 18 are three equally spaced downwardly projecting pins 20, 21 and 22 which project into arc-shaped slots 23, 24 and 25 respectively in the member 15. This provides a lost motion connection between the collar 17 and the inertia body, the freedom of movement between these two parts being determined by the amount of freedom of the pins in the slots.

The collar 17 rests on a shoulder on a flange 19[a] on the lower end of the sleeve 19. The collar is connected to the shaft 10 through an energy dissipating connection comprising a ring 26 which bears against the upper face of the flange 18, the cooperating surfaces of these two parts forming a friction clutch or brake. The ring 26 is held seated against the flange 18 by means of a helical spring 27, one end of which is connected to the ring 26 while its other end is connected to a flange and sleeve member 28 which is threaded on the upper end of the sleeve 19 and suitably secured against rotation thereon by a pin 28[a]. As shown the ends of the spring 27 are bent downward and upward respectively and seated in holes provided for them in the ring 26 and member 28 respectively. Besides holding the ring 26 seated against the flange 18, the spring 27 thus forms a driving connection between the shaft 10 and the ring 26. It will be observed that when the driving torque winds up the spring the lateral pressure applied by it will be decreased somewhat. To overcome this to a certain extent the spring 27 is made only slightly larger than the sleeve 28 which it surrounds so that when the spring is wound up it will grip the sleeve before the lateral pressure applied to the ring 26 has been materially decreased. The sleeve 28 is preferably detachably locked on the sleeve 19 so that the former may be screwed downward or upward to adjust the pressure which the spring exerts on the clutch ring 26. As shown the sleeve 28 is locked to the sleeve 19 by means of a removable pin or key 28[a].

In the operation of the device the shaft 10 has a small amount of freedom of movement independently of the inertia body by reason of the pin and slot connection. This allows the shaft to vibrate through a small amplitude without being damped. The pin and slot connection further allows the rotor shaft to speed up and then suddenly engage the inertia body as the pins reach the ends of the slots. This causes the ring 26 to slip on the flange 18 whereby a relatively large amount of energy is suddenly dissipated. This has the effect of retarding the tendency of the rotor shaft to accelerate with great rapidity so that the rotor is prevented from reaching a speed high enough to operate as a synchronous motor. After the rotor has engaged the rim, as previously described, it will, where its movement is to be continued, carry the rim around with it. When the rotor reaches the position in which it should come to rest, however, it will overrun due to its own inertia and the inertia of any parts which may be connected to it and as a result will oscillate from side to side of its proper position before coming to rest. With the damper mechanism, however, a considerable amount of energy is dissipated at each reversal of movement due to the reaction with the rim whereby the rotor is brought to rest after a comparatively few oscillations. The pin and slot connection has an important function in damping these oscillations since it gives the rotor a chance to start back at the end of each oscillation independently of the rim and thus gain a certain amount of kinetic energy of rotation before the rim is engaged.

The provision of the supporting bearing 14 for the inertia body 12 on the end of the shaft provides for a small friction radius whereby the bearing friction is reduced. A further reduction in friction is obtained by using the ball bearing. This bearing having very slight friction permits the shaft to move with the greatest possible freedom with respect to the inertia body through the angle permitted by the slots. The position of the inertia body 12 in a vertical direction is adjusted by providing shims 12[a] of suitable thickness so that the member 15 is in spaced relation with the flanges 18 and 19[a], the flanges being spaced sufficiently to provide for this clearance with the member 15. This adjustment eliminates friction at these points. The greatest possible acceleration of the shaft independently of the inertia body is thus provided for with a correspondingly great dissipation energy when the shaft suddenly engages the inertia body at the end of the slots.

Certain features of my invention are described and claimed in a copending application of Herbert Hollnagel, Serial No. 690,100, filed February 1, 1924, assigned to the same assignee as this invention, of which my invention is an improvement.

While I have described my invention as embodied in concrete form and as operating in a specific manner in accordance with the provisions of the patent statutes, it should be understood that I do not limit my invention thereto since modifications thereof will suggest themselves to those skilled in the art without departing from the spirit of my invention, the scope of which is set forth in the annexed claims.

What I claim as new and desire to secure by Letters Patent of the United States, is:—

1. Damping means for a vertical shaft comprising an inertia body, means for rotatably mounting said inertia body on the end of said shaft, said means providing a point support for said body lying substantially in the axis of said shaft, a driving connection between said body and said shaft including a lost motion connection, and means for dissipating energy upon relative movement between said shaft and said body beyond the limits of said lost motion connection.

2. Damping means for a vertical shaft comprising an inertia body, a bracket on said body, means interposed between said bracket and the end of said shaft forming a support for said body, a driving connection between said body and said shaft including a lost motion connection, and means for dissipating energy upon relative movement between said shaft and said body beyond the limits of said lost motion connection.

3. Damping means for a vertical shaft comprising an inertia body provided with a central aperture through which said shaft extends, a bracket on said body, a bearing between said bracket and the end of said shaft forming a support for said body on said shaft, and a driving connection between said body and said shaft including a lost motion connection, and means for dissipating energy upon relative movement between said shaft and said body beyond the limits of said lost motion connection.

4. The combination with a motion receiving instrument provided with a rotor having a vertical shaft, of means for damping the oscillations of said instrument in coming to rest comprising a flywheel rim, a bracket on said rim, a ball thrust bearing between said bracket and the end of said shaft forming a support for said rim, and a driving connection between said shaft and said rim including a pin and slot connection, and means for dissipating energy upon relative movement between said shaft and said rim beyond the limits of said pin and slot connection.

5. The combination with a motion receiving instrument provided with a rotor having a vertical shaft, of means for damping the oscillations of said instrument in coming to rest comprising a flywheel rim, means for rotatably mounting said flywheel rim on the upper end of said shaft, said means comprising a bracket on said rim and a ball bearing interposed between said bracket and the end of said shaft, the axis of said ball bearing being coaxial with the axis of said shaft, and a driving connection between said shaft and said flywheel including a pin and slot connection, a friction clutch, and a spring for said clutch forming a part of said driving connection.

In witness whereof, I have hereunto set my hand this 22nd day of October, 1927.

ALLEN E. BAILEY, Jr.